(12) United States Patent
Ott et al.

(10) Patent No.: US 10,683,952 B2
(45) Date of Patent: Jun. 16, 2020

(54) FLUID COUPLINGS AND METHODS FOR ADDITIVE MANUFACTURING THEREOF

(71) Applicant: United Technologies Corporation, Farmington, CT (US)

(72) Inventors: Joe Ott, Enfield, CT (US); Dennis M. Moura, South Windsor, CT (US); Stanley J. Funk, Southington, CT (US); Shawn Stempinski, Simsbury, CT (US); Roger O. Coffey, Glastonbury, CT (US); John J. Rup, Jr., Willington, CT (US); Gary A. Schirtzinger, Glastonbury, CT (US); Lexia Kironn, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 134 days.

(21) Appl. No.: 15/825,947

(22) Filed: Nov. 29, 2017

(65) Prior Publication Data

US 2018/0087696 A1 Mar. 29, 2018

Related U.S. Application Data

(62) Division of application No. 14/707,713, filed on May 8, 2015, now Pat. No. 9,857,002.

(Continued)

(51) Int. Cl.
*F16L 11/22* (2006.01)
*F16L 39/00* (2006.01)

(Continued)

(52) U.S. Cl.
CPC .............. *F16L 11/22* (2013.01); *B23P 15/00* (2013.01); *F02C 7/222* (2013.01); *F16L 39/005* (2013.01);

(Continued)

(58) Field of Classification Search
CPC ............. Y10T 29/4932; Y10T 29/4935; Y10T 29/4933; Y10T 29/49393; Y10T 29/49391; Y10T 29/49442; Y10T 29/4944; Y10T 29/49636; Y10T 29/49904; Y10T 29/4998; F16L 11/22; F16L 11/14; F16L 9/14; F16L 9/147; F16L 9/18; F16L 9/19; F16L 9/20;

(Continued)

(56) References Cited

U.S. PATENT DOCUMENTS 290,045 A 12/1883 Hardy
2,595,705 A 5/1952 Rosecrans (Continued)

FOREIGN PATENT DOCUMENTS

EP 2221456 8/2010
WO 2009148680 12/2009

*Primary Examiner* — Jason L Vaughan
(74) *Attorney, Agent, or Firm* — Getz Balich LLC (57) ABSTRACT

A method is provided involving an additive manufacturing system. This method includes a step of forming a first fluid conduit using the additive manufacturing system. The method also includes a step of providing a fluid coupling. The fluid coupling includes the first fluid conduit and a second fluid conduit. The first fluid conduit is connected to and fluidly coupled with the second fluid conduit. The first fluid conduit has a first configuration. The second fluid conduit has a second configuration that is different than the first configuration.

22 Claims, 7 Drawing Sheets

Related U.S. Application Data (60) Provisional application No. 61/991,163, filed on May 9, 2014.

(51) Int. Cl.
  *B23P 15/00*  (2006.01)
  *F02C 7/22*  (2006.01)
  *B33Y 80/00*  (2015.01)
  *B33Y 10/00*  (2015.01)

(52) U.S. Cl.
  CPC ............... *B33Y 10/00* (2014.12); *B33Y 80/00* (2014.12); *F05D 2230/31* (2013.01); *F05D 2260/36* (2013.01); *Y10T 29/4932* (2015.01); *Y10T 29/4933* (2015.01); *Y10T 29/4935* (2015.01); *Y10T 29/4998* (2015.01); *Y10T 29/49391* (2015.01); *Y10T 29/49393* (2015.01); *Y10T 29/49442* (2015.01); *Y10T 29/49444* (2015.01); *Y10T 29/49636* (2015.01); *Y10T 29/49904* (2015.01)

(58) Field of Classification Search
  CPC ... F16L 9/22; F16L 33/01; F16L 33/34; F16L 41/08; F16L 41/082; F16L 39/005; F05D 2260/204; F05D 2260/213; F05D 2260/36; F05D 2230/30; F05D 2230/31; B33Y 10/00; B33Y 80/00; B22F 3/1005; B22F 5/105; B22F 5/10; B29C 67/007
  USPC .................................................. 264/401, 497
  See application file for complete search history.

(56) References Cited

U.S. PATENT DOCUMENTS

| | | | |
|---|---|---|---|
| 4,954,299 A | 9/1990 | Greig | |
| 5,328,211 A | 7/1994 | Lewis et al. | |
| 6,240,731 B1 | 6/2001 | Hoke et al. | |
| 6,412,272 B1 | 7/2002 | Titterton, III | |
| 6,645,432 B1 * | 11/2003 | Anderson | B01L 3/0262 |
| | | | 422/502 |
| 7,007,864 B2 | 3/2006 | Snyder | |
| 7,323,143 B2 * | 1/2008 | Anderson | B01D 61/18 |
| | | | 422/502 |
| 7,777,155 B2 | 8/2010 | Twelves et al. | |
| 7,841,368 B2 | 11/2010 | McMasters et al. | |
| 8,127,547 B2 | 3/2012 | Norris | |
| 8,186,164 B2 | 5/2012 | Cowan | |
| 8,210,211 B2 * | 7/2012 | McMasters | B23P 6/007 |
| | | | 138/115 |
| 8,336,313 B2 * | 12/2012 | McMasters | B23P 6/007 |
| | | | 60/742 |
| 8,383,985 B2 | 2/2013 | Twelves et al. | |
| 8,678,348 B1 * | 3/2014 | Cassel | F16K 1/04 |
| | | | 251/223 |
| 8,915,728 B2 | 12/2014 | Mironets et al. | |
| 8,978,711 B2 * | 3/2015 | Satou | F16L 9/19 |
| | | | 138/114 |
| 9,200,855 B2 | 12/2015 | Kington et al. | |
| 9,272,437 B2 * | 3/2016 | Hashish | B24C 5/02 |
| 9,416,662 B2 | 8/2016 | Morgan et al. | |
| 9,458,955 B2 * | 10/2016 | Hammer | B29C 33/52 |
| 9,844,890 B2 * | 12/2017 | Hashish | B24C 5/02 |
| 9,844,912 B2 * | 12/2017 | Hemingway | F16L 37/0982 |
| 2007/0236018 A1 | 10/2007 | Husmann et al. | |
| 2009/0255102 A1 | 10/2009 | McMasters et al. | |
| 2009/0255256 A1 | 10/2009 | McMasters et al. | |
| 2010/0065142 A1 * | 3/2010 | McMasters | B23P 6/007 |
| | | | 138/115 |
| 2012/0228397 A1 * | 9/2012 | Thomson | F23R 3/28 |
| | | | 239/13 |
| 2013/0236299 A1 * | 9/2013 | Kington | F02C 7/10 |
| | | | 415/177 |
| 2014/0023812 A1 * | 1/2014 | Hammer | B29C 33/52 |
| | | | 428/36.9 |
| 2014/0084583 A1 * | 3/2014 | Hemingway | F16L 37/0982 |
| | | | 285/374 |
| 2014/0093384 A1 | 4/2014 | Mironets et al. | |
| 2015/0121883 A1 | 5/2015 | Wolfe et al. | |
| 2015/0315773 A1 * | 11/2015 | Mullaney | B29O 64/386 |
| | | | 285/125.1 |

* cited by examiner

FLUID COUPLINGS AND METHODS FOR ADDITIVE MANUFACTURING THEREOF

This patent application is a divisional of and claims priority to U.S. patent application Ser. No. 14/707,713 filed May 8, 2015, which claims priority to U.S. Provisional Patent Application No. 61/991,163 filed May 9, 2014. The disclosures of which are hereby incorporated herein by reference in their entireties.

BACKGROUND OF THE INVENTION

1. Technical Field

This disclosure relates generally to a fluid coupling and, more particularly, to connecting conduits of a fluid coupling together as well as methods for manufacturing the fluid coupling. Such a fluid coupling may be included in various industrial and consumer equipment including, but not limited to, turbine engines.

2. Background Information

A turbine engine may include a fluid circuit for delivering or circulating fluid such as fuel, lubricant and/or coolant. Such a fluid circuit may include a fluid coupling that includes a plurality of fluid conduits connected together. A typical transition between adjacent fluid conduits may be relatively abrupt due to manufacturing constraints. Such an abrupt transition may create flow disturbances and/or lead to formation of coke where, for example, the fluid flowing within the fluid conduits is jet fuel.

There is a need in the art for improved connections between fluid conduits as well as improved methods for forming conduits of a fluid coupling.

SUMMARY OF THE DISCLOSURE

According to an aspect of the invention, a method is provided involving an additive manufacturing system. This method includes a step of forming a first fluid conduit using the additive manufacturing system. The method also includes a step of providing a fluid coupling. The fluid coupling includes the first fluid conduit and a second fluid conduit. The first fluid conduit is connected to and fluidly coupled with the second fluid conduit. The first fluid conduit has a first configuration. The second fluid conduit has a second configuration that is different than the first configuration.

According to another aspect of the invention, an assembly is provided for a fluid delivery system. This assembly includes a fluid coupling, which includes a first fluid conduit, a second fluid conduit and a compliant intermediate fluid conduit. The intermediate fluid conduit connects and fluidly couples the first fluid conduit to the second fluid conduit. The intermediate fluid conduit is formed integral with the first and the second fluid conduits.

According to still another aspect of the invention, another assembly is provided for a fluid delivery system. This assembly includes a fluid coupling, which includes a first fluid conduit and a second fluid conduit. The first fluid conduit is connected to and fluidly coupled with the second fluid conduit at a joint. The first fluid conduit is interlocked with the second fluid conduit at the joint.

The method may include a step of forming the second fluid conduit using the additive manufacturing system.

The second fluid conduit may be formed integral with the first fluid conduit.

The first fluid conduit may be connected to and fluidly coupled with the second fluid conduit during the forming of the first and the second fluid conduits.

The method may include a step of fluidly coupling the first fluid conduit to the second fluid conduit after the forming of the first and the second fluid conduits.

The method may include a step of connecting and fluidly coupling the first fluid conduit to the second fluid conduit. The first fluid conduit may be formed discretely from the second fluid conduit.

A joint between the first fluid conduit acid the second fluid conduit may have a non-rectangular configuration.

The first fluid conduit may interlock with the second fluid conduit.

The method may include a step of connecting and fluidly coupling the first fluid conduit to the second fluid conduit through a compliant intermediate fluid conduit. The intermediate fluid conduit may be formed integral with the first and the second fluid conduits.

The first fluid conduit may have a cross-section with a first shape. The second fluid conduit may have a cross-section with a second shape that is different than (or the same as) the first shape. In addition or alternatively, the first fluid conduit may form a first flowpath with a first cross-sectional area. The second fluid conduit may form a second flowpath with a second cross-sectional area that is different than (or the same as) the first cross-sectional area.

The intermediate fluid conduit may be adapted to allow movement between the first and the second fluid conduits.

The intermediate fluid conduit may extend along a substantially straight centerline.

The intermediate fluid conduit may extend along a curved and/or compound centerline.

The first fluid conduit may have a first configuration. The second fluid conduit may have a second configuration that is different than (or the same as) the first configuration, The assembly may include a fluid source and a turbine engine component. The turbine engine component may be fluidly coupled to the fluid source through the fluid coupling.

The first fluid conduit may be formed integral with the second fluid conduit.

The foregoing features and the operation of the invention will become more apparent in light of the following description and the accompanying drawings.

DETAILED DESCRIPTION OF THE INVENTION

Figure 1:
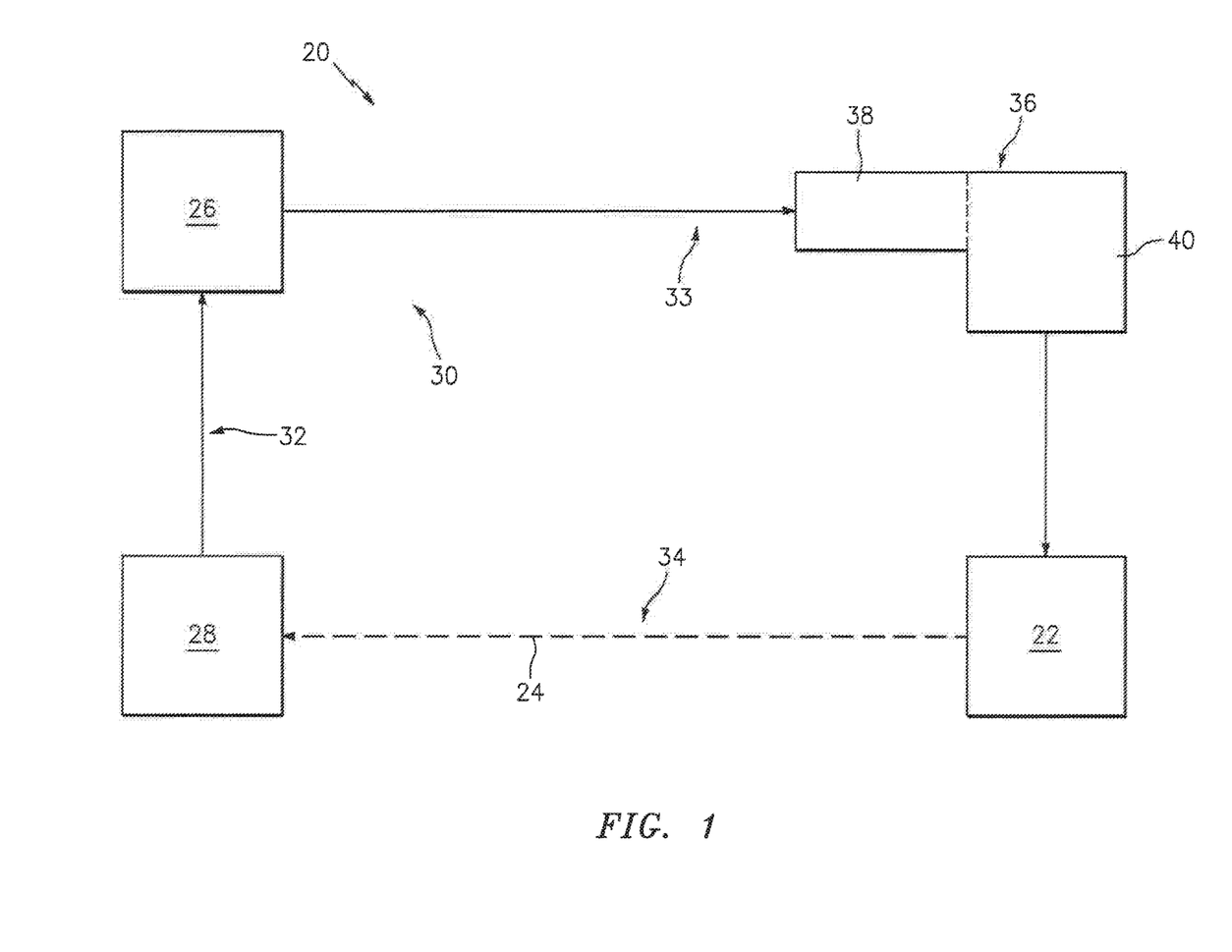
FIG. 1 is a block diagram of a fluid delivery system configured to deliver fluid to a component.

FIG. 1 is a block diagram of a fluid delivery system 20 configured to deliver fluid to a component 22. The fluid delivery system 20 may also be configured to receive fluid from the component 22 as illustrated by the dashed line 24; e.g., circulate the fluid through the component 22.

The component 22 may be configured as or include a heat exchanger, a bearing, a gear train, a nozzle (see FIG. 2), a combustor, an augmentor or a diffuser. For ease of description, the component 22 is described below and illustrated in FIG. 2 as nozzle (e,g., a nozzle plate) of a gas turbine engine fuel injector. The fluid delivery system 20, however, is not limited to delivering fluid to the exemplary components described above. For example, the component 22 may be configured as any fluid receiving device or system of a turbine engine. Furthermore, the fluid delivery system 20 may also be configured to deliver the fluid to a plurality of components in serial and/or in parallel, some or all of which may have the same configuration or different configurations.

The fluid may be heat exchange fluid (e.g., liquid and/or gaseous coolant), and delivered to cool or heat the component 22. The fluid may be actuator fluid (e.g., hydraulic liquid or compressed air), and delivered to actuate the component 22. The fluid may be fuel, and delivered for distribution by or combustion within the component 22. The fluid delivery system 20, however, is not limited to delivering the exemplary fluids described above.

The fluid delivery system 20 of FIG. 1 includes a fluid pump 26 and a fluid source 28; e.g., a reservoir, a tank, a sump or an inlet. The fluid delivery system 20 also includes a fluid circuit 30 that fluidly couples the components 22, 26 and 28 together in an open loop, or in a closed loop as shown by the dashed line 24.

The fluid circuit 30 includes a plurality of fluid couplings 32-34. Each of the couplings 32-34 includes one or more coupling devices, which form a fluid flowpath through which the fluid may be directed between respective components. Examples of a coupling device include, but are not limited to, a conduit (e.g., a pipe, hose or duct), a manifold, a splitter, a valve, a regulator, a meter and a filter.

The coupling 32 may extend between and fluidly couples the fluid source 28 to the fluid pump 26. The coupling 33 may extend between and fluidly couples the fluid pump 26 to the component 22. The coupling 34 may extend between and fluidly couples the component 22 to the fluid source 28.

At least one of the couplings 32-34 includes a coupling assembly 36. This coupling assembly 36 forms at least a portion of one of the couplings 32-34. For ease of description, the coupling assembly 36 is described below and illustrated in FIG. 1 as being included in and forming at least a portion of the coupling 33. However, in other embodiments, the coupling assembly 36 may alternatively be included in and form at least a portion of one of the other couplings 32 or 34. Furthermore, in some embodiments, the fluid circuit 30 may include a plurality of coupling assemblies, in parallel and/or in serial, that partially or completely form one or more of the couplings 32-34.

Figure 2:
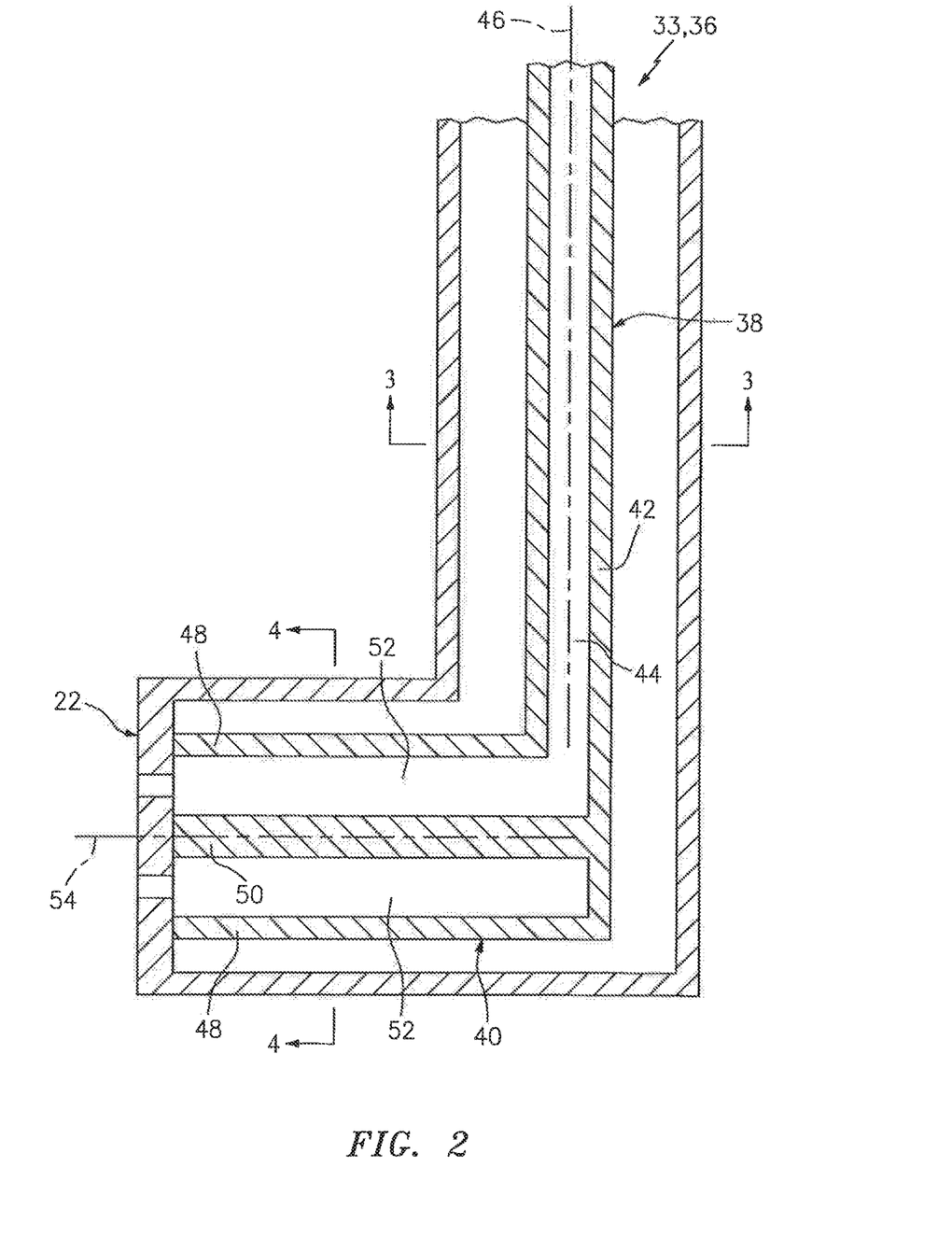
FIG. 2 is a side sectional illustration of a portion of a turbine engine fuel injector.

Referring to FIG. 2, the coupling assembly 36 includes a plurality of fluid conduits 38 and 40. Each of these fluid conduits 38 and 40 may be configured as a pipe, a hose, a duct or any other generally tubular object for directing fluid therethrough, The first fluid conduit 38 may have a generally tubular sidewall 42 that forms a fluid flowpath 44; e.g., a generally cylindrical fluid flowpath. This fluid flowpath 44 extends along a centerline 46 through the first fluid conduit 38.

Figure 3:
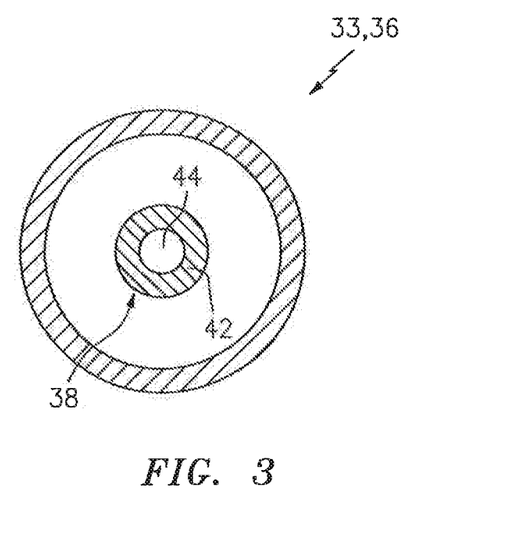
FIG. 3 is a cross-sectional illustration of the fuel injector of FIG. 2 at a first location.

Referring to FIG. 3, the sidewall 42 may have an annular circular cross-sectional geometry. The first fluid conduit 38, however, is not limited to such a cross-sectional geometry. The sidewall 42, for example, may alternatively have an annular elongated, rectangular and/or irregular cross-sectional geometry. Furthermore, in some embodiments, the first fluid conduit 38 may include a protrusion (or another sidewall) that provides the fluid flowpath 44 with an annular geometry as described below with reference to the second fluid conduit 40 (see FIG. 4). The coupling assembly 36, of course, is not limited to the foregoing exemplary first fluid conduit 38 configurations.

Referring to FIG. 2, the second fluid conduit 40 may have a generally tubular outer sidewall 48 and an inner protrusion 50; e.g., a solid cylindrical object. The sidewall 48 and protrusion 50 are configured to form a fluid flowpath 52; e.g., an annular fluid flowpath. This fluid flowpath 52 extends along a centerline 54 through the second fluid conduit 40 and is fluidly coupled with the fluid flowpath 44.

Figure 4:
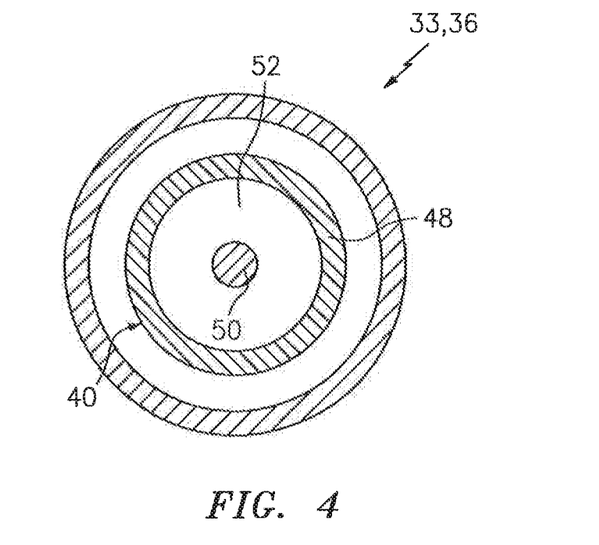
FIG. 4 is a cross-sectional illustration of the fuel injector of FIG. 2 at a second location.

Referring to FIG. 4, the sidewall 48 may have an annular circular cross-sectional geometry. The first fluid conduit 38, however, is not limited to such a cross-sectional geometry. The sidewall 48, for example, may alternatively have an annular elongated, rectangular and/or irregular cross-sectional geometry. Furthermore, in some embodiments, the second fluid conduit 40 may be configured without the protrusion 50, or the protrusion 50 may be replaced with an inner sidewall. The coupling assembly 36, of course, is not limited to the foregoing exemplary second fluid conduit 40 configurations.

The fluid conduits 38 and 40 are described above and illustrated in the drawings with different configurations. In particular, the first fluid conduit 38 and the second fluid conduit 40 are configured with cross-sections of different shapes. A cross-sectional area of the fluid flowpath 44 is also different (e.g., smaller) than a cross-sectional area of the fluid flowpath 52. However, in other embodiments, the fluid conduits 38 and 40 may have substantially similar configurations. Furthermore, while the fluid conduits 38 and 40 are illustrated in the drawings with nonparallel (e.g., perpendicular or otherwise angled) centerlines 46 and 54, in other embodiments the centerlines 46 and 54 may be parallel and even co-axial.

Referring to FIG. 2, the first fluid conduit 38 is connected to the second fluid conduit 40. An end of the first fluid conduit 38, for example, is connected to an end of the second fluid conduit 40. The first fluid conduit 38 may be formed integral with the second fluid conduit 40 as illustrated in FIG. 2. Alternatively, referring to FIGS. 5-7, the first and the second fluid conduits 38 and 40 may be formed as discrete (e.g., separate) units and subsequently attached to one another via a bonded connection (and/or a mechanical connection).

A joint 56 between the fluid conduits 38 and 40 may various non-interlocking and interlocking configurations. Examples of a joint with a non-interlocking configuration include, but are not limited to, a beveled lap joint (see FIG. 5), a modified bridle joint (see FIG. 6), a butt joint and a shiplap joint. Examples of a joint with an interlocking configuration include, but are not limited to, a tabled splice joint (see FIG. 7) and a dovetail joint.

Figure 5:
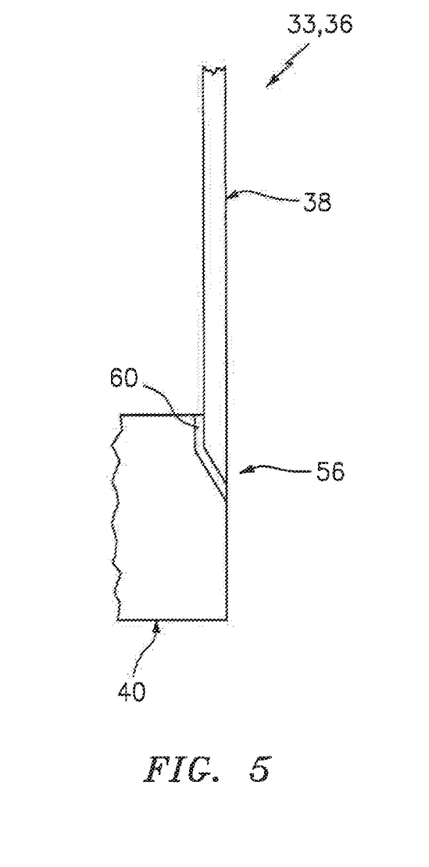
FIGS. 5-12 are partial side illustrations of various alternative embodiments of a fluid coupling for the fuel injector of FIG. 2.
Figure 6:
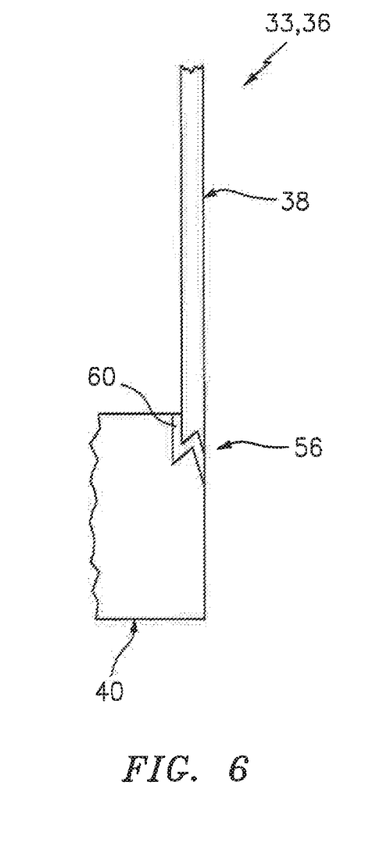
Figure 7:
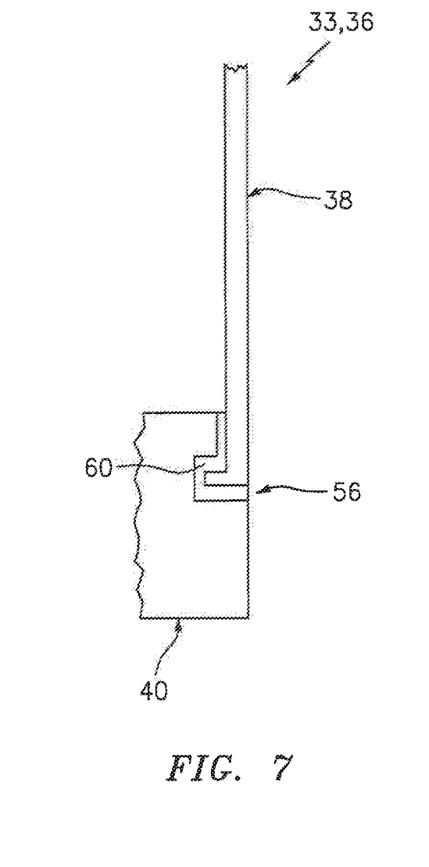
Figure 8:
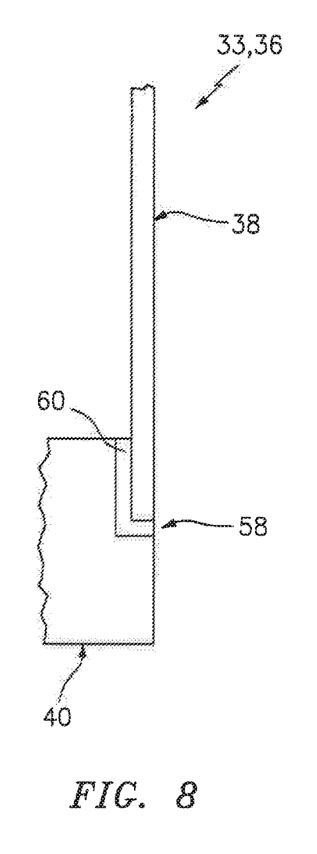

It is worth noting, a rectangular joint 58 as illustrated in FIG. 8 may provide a relatively abrupt transition between the fluid conduits 38 and 40. Such an abrupt transition may cause fluid flow disturbances (e.g., turbulence) and/or lead to formation of coke Where the fluid flowing within the conduits 38 and 40 is heated fuel. In contrast, the non-rectangular joint 56 embodiments of FIGS. 5-7 are configured to provide a relatively gradual transition between the fluid conduits 38 and 40. More particularly, fluid flowing between the fluid conduits 38 and 40 progressively interacts with different portions of the joint 56. The gradual transition of the joint therefore may be useful in, among other things, reducing fluid flow disturbances and/or reducing formation of coke where the fluid delivery system 20 is configured for delivering fuel in a turbine engine. In addition, the joint 56 embodiments of FIGS. 5-7 may be more durable than the joint 58 embodiment of FIG. 8.

A gap (or gaps) between the fluid conduits 38 and 40 may be filled with filler material 60. Examples of filler material include, but are not limited to, bonding material such as braze, weld and adhesive. Another example of filler material is a seal; e.g., a metal or elastomeric seal. The filler material 60 may be operable to at least partially thermally decouple the first fluid conduit 38 from the second fluid conduit 40. The filler material 60 may also or alternatively be operable to reduce stress at the joint 56, 58 where, for example, the fluid conduits 38 and 40 are subjected to opposing forces and/or moments.

Figure 9:
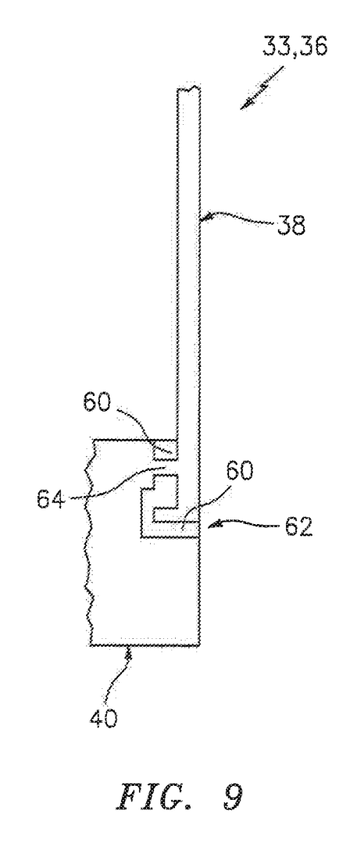

FIG. 9 illustrates a hybrid joint 62 between the first fluid conduit 38 and the second fluid conduit 40. In this embodiments, the first fluid conduit 38 is formed integral with the second fluid conduit 40 where a bridge 64 integrally connects the conduits 38 and 40 together. This bridge 64 may be useful when forming the first and the second fluid conduits 38 and 40 using additive manufacturing. In contrast to the embodiment of FIG. 2, however, gaps extend between the fluid conduits 38 and 40 that are filled with filler material 60 as described above. Thus, a seal between the fluid conduits 38 and 40 is provided by both fluid conduit 38, 40 material as well as the filler material 60 whereas the seal between the fluid conduits 38 and 40 of FIG. 2 may be provided solely by the fluid conduit 38, 40 material.

The fluid conduits 38 and 40 may be substantially directly connected together as illustrated in FIGS. 2 and 5-9. Alternatively, referring to FIGS. 10-12, the fluid conduits 38 and 40 may be indirectly connected together through, for example, an intermediate fluid conduit 66. This intermediate fluid conduit 66 may be configured as a compliant intermediate fluid conduit. The intermediate fluid conduit 66, for example, may be configured to flex thereby allowing "towards and away" movement, "side-to-side" movement and/or "twisting" movement between the fluid conduits 38 and 40. Thus, the intermediate fluid conduit 66 may serve to reduce the transfer of forces and/or moments between the fluid conduits 38 and 40.

Figure 10:
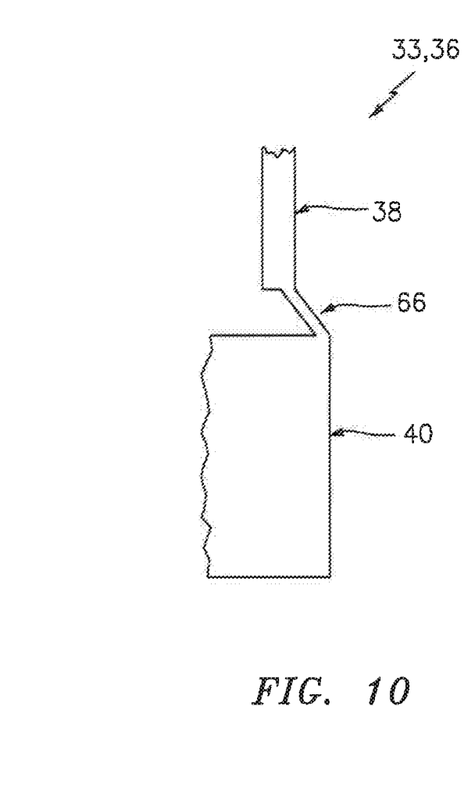
Figure 11:
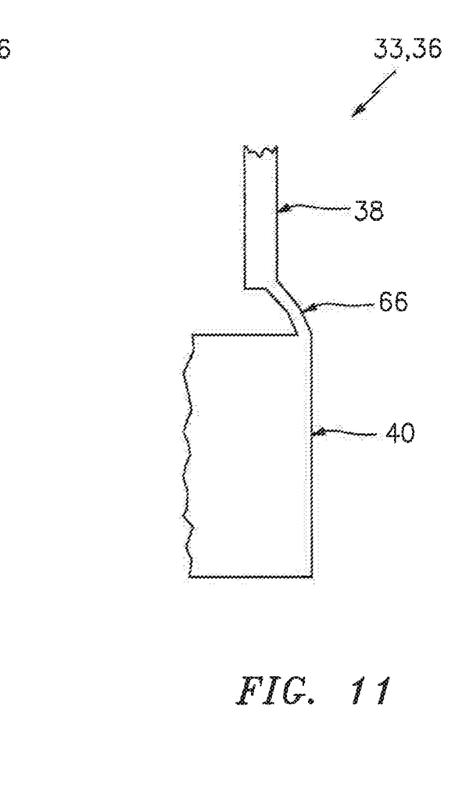
Figure 12:
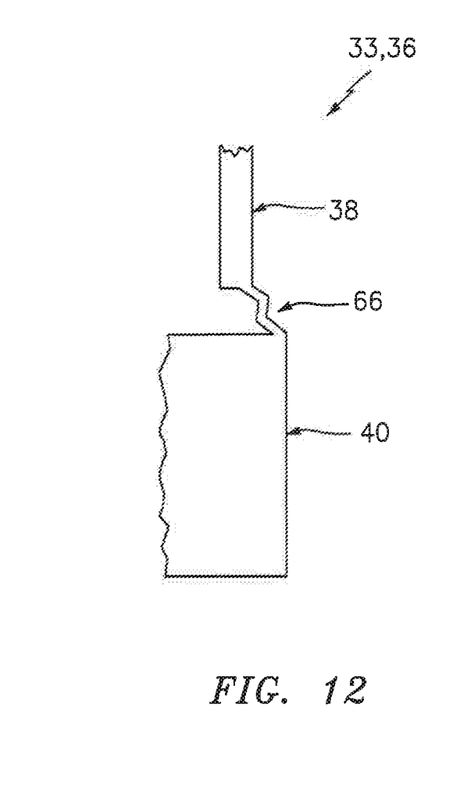

The intermediate fluid conduit 66 may be formed integral with the first fluid conduit 38 and/or the second fluid conduit 40. The intermediate fluid conduit 66 may extend along a substantially straight centerline as illustrated in FIG. 10. Alternatively, the intermediate fluid conduit 66 may extend along a curved centerline as illustrated in FIG. 11 and/or a compound centerline as illustrated in FIG. 12. The coupling assembly 36, however, is not limited to the exemplary intermediate fluid conduit 66 configurations described above and illustrated in the drawings.

The coupling assembly 36 embodiments described above and illustrated in the drawings may be manufactured using various processes. One or more of the coupling assembly components 38, 40, 64 and 66 may be formed integral with one another; e.g., formed as a single unit. Alternatively or in addition, one or more of the coupling assembly components 38, 40, 64 and 66 may be formed discrete from one another; e.g., as physically separate units. These discrete components may subsequently be assembled and attached to one another; e.g., mechanically fastened and/or bonded.

The coupling assembly components 38, 40, 64 and 66 are described above and illustrated in the drawings as having substantially constant cross-sectional geometries. For example, the Shape and the size of the first fluid conduit 38 remains substantially constant as the conduit 38 extends along its centerline 46. Similarly, the shape and the size of the second fluid conduit 40, the bridge 64 and the intermediate fluid conduit 66 remain substantially constant as these components 40, 64 and 66 extend along their centerlines. In some embodiments, however, the cross-sectional geometries (e.g., the shapes and/or the sizes) of at least a portion of one or more of the components 38, 40, 64 and 66 may change as the respective components 40, 64 and 66 extend along their centerlines. For example, the diameter of one or more the fluid conduits 38 and 40 may decrease or increase as they extend towards the joint 56. The shape of one or more of the fluid conduits 38 and 40 may also or alternatively change at the joint 56 to provide a gradual transition therebetween. Of course, various other coupling assembly component configurations are also possible and are intended to be within the scope of the present disclosure.

The coupling assembly components 38, 40, 64 and 66 may be formed discretely and/or integral with one another using an additive manufacturing process. The term "additive manufacturing" may describe a process where an additive manufacturing system builds up a part or parts in a layer-by-layer fashion. For example, for each layer, the additive manufacturing system may spread and compact a layer of additive manufacturing material (e.g., metal powder and/or non-metal powder) and solidify one or more portions of this material layer with an energy beam; e.g., a laser beam or an electron beam. Examples of an additive manufacturing system include, but are not limited to, a laser sintering system, an electron beam system, a laser powder deposition system and an EB wire deposition system. Examples of metal(s) from which the coupling assembly 36 may be formed include, but are not limited to, nickel (Ni), titanium (Ti), steel, stainless steel, cobalt (Co), chromium (Cr), tungsten (W), molybdenum (Mo) and/or alloys including one or more of the foregoing metals such as Waspaloy, Stellite, etc. The coupling assembly components, however, are not limited to being formed using additive manufacturing or the foregoing metal materials. For example, one or more of the coupling assembly components 38, 40, 64 and 66 may also or alternatively be formed using casting, machining, milling and/or any other manufacturing process.

The fluid delivery system 20 of FIG. 1 may be configured with or included in various types of apparatuses and systems. The fluid delivery system 20, for example, may be configured in a fuel delivery system, a lubrication system and/or a cooling or heating system of a turbine engine or any other type of engine. An example of such a turbine engine 94 (e.g., a geared turbofan engine) is illustrated in FIG. 13.

Figure 13:
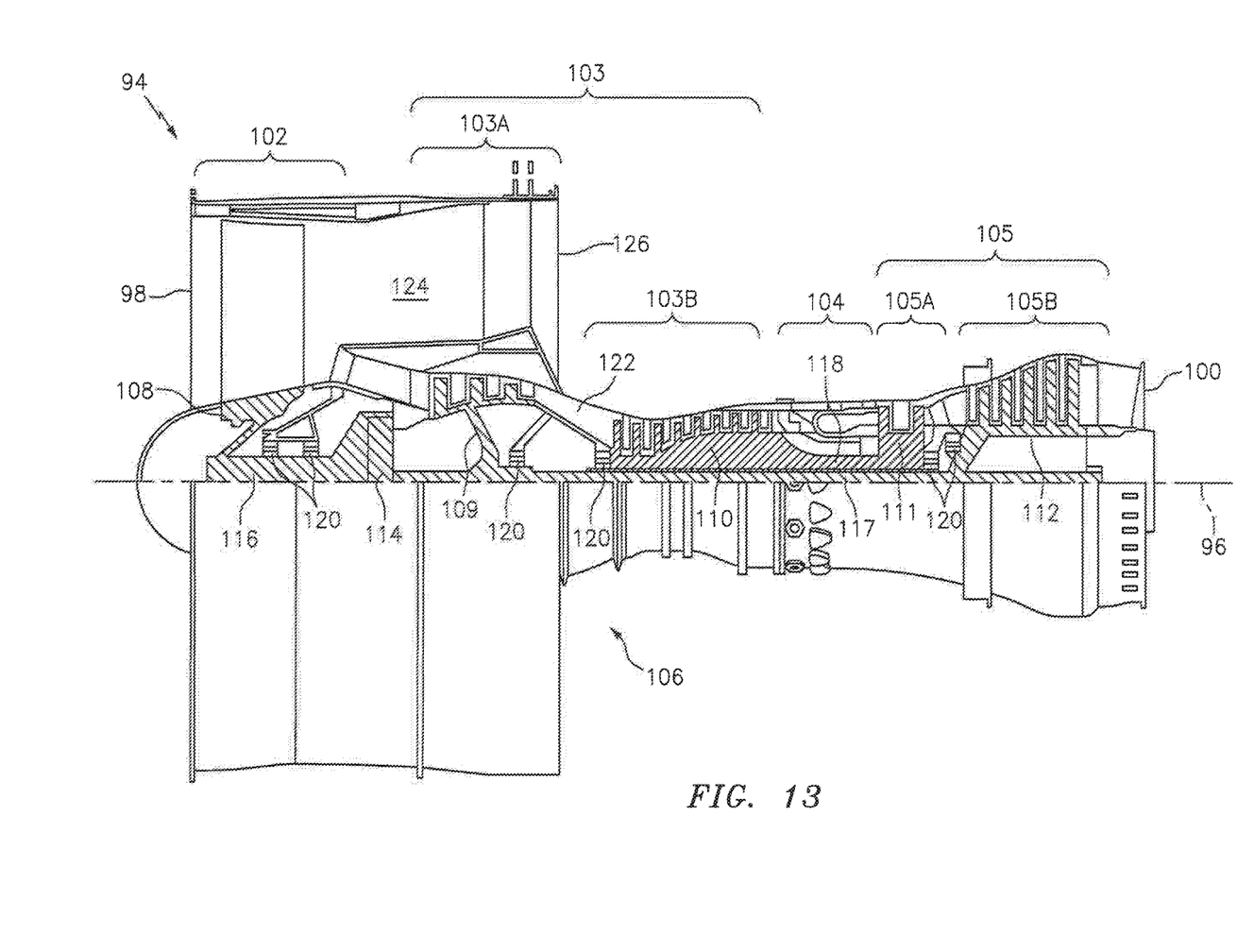
FIG. 13 is a side cutaway illustration of a geared turbine engine.

The turbine engine 94 of FIG. 13 extends along an axial centerline 96 between an upstream airflow inlet 98 and a downstream airflow exhaust 100. The turbine engine 94 includes a fan section 102, a compressor section 103, a combustor section 104 and a turbine section 105. The compressor section. 103 includes a low pressure compressor (LPC) section 103A and a high pressure compressor (HPC) section 103B. The turbine section 105 includes a high pressure turbine (HPT) section 105A and a low pressure turbine (LPT) section 105B. The engine sections 102-105 are arranged sequentially along the centerline 96 within a housing 106.

Each of the engine sections 102-103B, 105A and 105B includes a respective rotor 108-112. Each of these rotors 108-112 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 108 is connected to a gear train 114, for example, through a fan shaft 116. The gear train 114 and the LPC rotor 109 are connected to and driven by the LPT rotor 112 through a low speed shaft 117. The HPC rotor 110 is connected to and driven by the HPT rotor 111 through a high speed shaft 118. The shafts 116-118 are rotatably supported by a plurality of bearings 120; e.g., rolling element and/or thrust bearings. Each of these bearings 120 is connected to the engine housing 106 by at least one stationary structure such as, for example, an annular support strut.

During operation, air enters the turbine engine 94 through the airflow inlet 98, and is directed through the fan section 102 and into a core gas path 122 and a bypass gas path 124. The air within the core gas path 122 may be referred to as "core air". The air within the bypass gas path 124 may be referred to as "bypass air". The core air is directed through the engine sections 103-105 and exits the turbine engine 94 through the airflow exhaust 100 to provide forward engine thrust. Within the combustor section 104, fuel is injected into a combustion chamber and mixed with the core air. This fuel-core air mixture is ignited to power the turbine engine 94. The bypass air is directed through the bypass gas path 124 and out of the turbine engine 94 through a bypass nozzle 126 to provide additional forward engine thrust. Alternatively, at least some of the bypass air may be directed out of the turbine engine 94 through a thrust reverser to provide reverse engine thrust.

The fluid delivery system 20 may be included in various turbine engines other than the one described above. The fluid delivery system 20, for example, may be included in a geared turbine engine where a gear train connects one or more shafts to one or more rotors in a fan section, a compressor section and/or any other engine section. Alternatively, the fluid delivery system 20 may be included in a turbine engine configured without a gear train. The fluid delivery system 20 may be included in a geared or non-geared turbine engine configured with a single spool, with two spools (e.g., see FIG. 13), or with more than two spools. The turbine engine may be configured as a turbofan engine, a turbojet engine, a prop his engine, or any other type of turbine engine. The present invention therefore is not limited to any particular turbine engine types or configurations. Furthermore, while the fluid delivery system 20 is described above as being included in a turbine engine, the system may also be configured with various non-turbine engine systems; e.g., HVAC systems, automobile systems, etc.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method involving an additive manufacturing system, the method comprising:

forming a first fluid conduit using the additive manufacturing system;

forming a second fluid conduit as a discrete and physically separate unit from the first fluid conduit; and providing a fluid coupling, the fluid coupling including the first fluid conduit and the second fluid conduit, and the providing of the fluid coupling comprising attaching and fluidly coupling the first fluid conduit and the second fluid conduit together after the forming of the second fluid conduit;

wherein the first fluid conduit has a first configuration, the second fluid conduit has a second configuration that is different than the first configuration, and a joint between the first fluid conduit and the second fluid conduit has a non-rectangular configuration.

2. The method of claim 1, further comprising forming the second fluid conduit using the additive manufacturing system.

3. The method of claim 1, wherein the first fluid conduit interlocks with the second fluid conduit at a joint.

4. The method of claim 1, wherein the first fluid conduit has a cross-section with a first shape; and the second fluid conduit has a cross-section with a second shape that is different than the first shape.

5. The method of claim 1, wherein the first fluid conduit forms a first flowpath with a first cross-sectional area; and the second fluid conduit forms a second flowpath with a second cross-sectional area that is different than the first cross-sectional area.

6. The method of claim 1, wherein the attaching of the first fluid conduit and the second fluid conduit together comprises attaching the first fluid conduit to the second fluid conduit with filler material.

7. The method of claim 6, wherein the filler material comprises a metal seal.

8. The method of claim 6, wherein the filler material comprises an elastomeric seal.

9. The method of claim 1, wherein the attaching of the first fluid conduit and the second fluid conduit together comprises bonding the first fluid conduit to the second fluid conduit with bonding material.

10. The method of claim 1, wherein the attaching of the first fluid conduit and the second fluid conduit together comprises welding the first fluid conduit to the second fluid conduit.

11. The method of claim 1, wherein the attaching of the first fluid conduit and the second fluid conduit together comprises brazing the first fluid conduit to the second fluid conduit.

12. The method of claim 1, wherein the attaching of the first fluid conduit and the second fluid conduit together comprises adhering the first fluid conduit to the second fluid conduit with an adhesive.

13. The method of claim 1, wherein the joint comprises a beveled lap joint.

14. The method of claim 1, wherein the joint comprises a brindle joint.

15. The method of claim 1, wherein the joint comprises a tabled splice joint.

16. The method of claim 1, wherein the forming of the first fluid conduit comprises additively manufacturing the first fluid conduit using the additive manufacturing system.

17. The method of claim 1, wherein the first fluid conduit is fluidly coupled with the second fluid conduit in a serial arrangement.

18. A method involving an additive manufacturing system, the method comprising:

forming a first fluid conduit using the additive manufacturing system;

forming a second fluid conduit as a discrete and physically separate unit from the first fluid conduit; and providing a fluid coupling, the fluid coupling including the first fluid conduit and the second fluid conduit, and the providing of the fluid coupling comprising attaching and fluidly coupling the first fluid conduit and the second fluid conduit together after the forming of the second fluid conduit;

wherein the first fluid conduit has a first configuration, the second fluid conduit has a second configuration that is different than the first configuration, and the first fluid conduit interlocks with the second fluid conduit.

19. The method of claim 18, wherein the first fluid conduit has a cross-section with a first shape; and the second fluid conduit has a cross-section with a second shape that is different than the first shape.

20. The method of claim 18, wherein the first fluid conduit forms a first flowpath with a first cross-sectional area; and the second fluid conduit forms a second flowpath with a second cross-sectional area that is different than the first cross-sectional area.

21. A method involving an additive manufacturing system, the method comprising:

providing a fluid coupling that includes a first fluid conduit and a second fluid conduit that is connected to and fluidly coupled in serial with the first fluid conduit at a joint;

the providing of the fluid coupling comprising additively manufacturing at least the first fluid conduit using an additive manufacturing system;

wherein the first fluid conduit is attached to the second fluid conduit at the joint by a bridge that is formed integral with the first fluid conduit and extends from the first fluid conduit to the second fluid conduit;

wherein the first fluid conduit is further attached to the second fluid conduit at the joint by filler material that contacts the first fluid conduit, the second fluid conduit and the bridge;

wherein the first fluid conduit has a first configuration;

wherein the second fluid conduit has a second configuration that is different than the first configuration.

22. The method of claim 21, wherein the joint has a non-rectangular configuration.

\* \* \* \* \*